US007896358B2

(12) United States Patent
Hoff

(10) Patent No.: US 7,896,358 B2
(45) Date of Patent: Mar. 1, 2011

(54) MAGNETO-RHEOLOGICAL INERTIAL DAMPING SYSTEM FOR LIFT TRUCKS

(75) Inventor: William H Hoff, Tillsonburg (CA)

(73) Assignee: The Raymond Corporation, Greene, NY (US)

( * ) Notice: Subject to any disclaimer, the term of this patent is extended or adjusted under 35 U.S.C. 154(b) by 355 days.

(21) Appl. No.: 11/924,160

(22) Filed: Oct. 25, 2007

(65) Prior Publication Data

US 2009/0107774 A1 Apr. 30, 2009

(51) Int. Cl.
*B66F 9/06* (2006.01)
*B60G 17/016* (2006.01)
*B60G 17/08* (2006.01)

(52) U.S. Cl. ........................ 280/5.5; 280/755; 180/282; 414/631; 187/222

(58) Field of Classification Search ............. 280/5.507, 280/5.5, 5.515, 5.519, 6.15, 6.159, 6.157, 280/755; 180/282; 414/631, 630; 187/222, 187/224, 232
See application file for complete search history.

(56) References Cited

U.S. PATENT DOCUMENTS 2,564,002 A 8/1951 Gibson
3,392,797 A 7/1968 Gibson et al.
3,949,892 A 4/1976 Ohms
4,340,235 A * 7/1982 Thompson ............... 280/6.159
4,813,512 A 3/1989 McCormick
4,892,328 A 1/1990 Kurtzman et al.
5,269,556 A 12/1993 Heyring
(Continued)

FOREIGN PATENT DOCUMENTS

DE 196 34 897 C1 9/1997
(Continued)

OTHER PUBLICATIONS

De Man P. et al., "An Investigation of a Semiactive Suspension for a Fork Lift Truck," Vehicle System Dynamics, vol. 43, No. 2, Feb. 2005, p. 107-119.

(Continued)

*Primary Examiner*—Paul N Dickson
*Assistant Examiner*—Keith Frisby
(74) *Attorney, Agent, or Firm*—Quarles & Brady, LLP; Thomas J. Krumenacher

(57) ABSTRACT

A lift truck includes a magneto-rheological damper coupled between the base frame and a frame holding a vertically sprung suspended wheel. The damper is electrically connected to a vehicle control system, which increases and decreases the damping force as a function of at least one of a weight of a load on the forks of the lift truck, a height of the mast of the lift truck, and a speed of the lift truck. As the weight of the load, height of the mast and speed of the vehicle increase, the damping force is increased. As the weight of the load, height of the mast, and speed of the vehicle decrease, the damping force is decreased. When the damper is activated to increase the damping force, the truck can maintain a four point stance, providing a larger footprint for the center of gravity, thereby limiting truck sway or oscillation. When the damper is not active, or the damping force is increased, as, for example, during unloaded operation, the suspension of the truck is relatively soft, providing a smoother ride, thereby increasing operator comfort and productivity.

20 Claims, 10 Drawing Sheets

U.S. PATENT DOCUMENTS

| | | | | |
|---|---|---|---|---|
| 5,276,623 | A | 1/1994 | Wolfe | |
| 5,277,281 | A | 1/1994 | Carlson et al. | |
| 5,685,555 | A | 11/1997 | McCormick et al. | |
| 6,068,249 | A | 5/2000 | Shtarkman | |
| 6,179,304 | B1 | 1/2001 | Ishikawa et al. | |
| 6,454,034 | B1 | 9/2002 | Gotz | |
| 6,565,073 | B1 | 5/2003 | Carlstedt et al. | |
| 6,681,905 | B2 | 1/2004 | Edmondson et al. | |
| 6,719,098 | B1 * | 4/2004 | Ishikawa et al. | 187/222 |
| 6,981,331 | B1 | 1/2006 | Poe, Jr. et al. | |
| 7,051,849 | B2 | 5/2006 | Browne et al. | |
| 2003/0102193 | A1 | 6/2003 | Edmondson et al. | |
| 2004/0104061 | A1 | 6/2004 | Oliver et al. | |
| 2004/0129468 | A1 | 7/2004 | Oliver et al. | |
| 2006/0060750 | A1 | 3/2006 | Alexandridis | |
| 2007/0088475 | A1 * | 4/2007 | Nordgren et al. | 701/37 |

FOREIGN PATENT DOCUMENTS

| | | | |
|---|---|---|---|
| EP | 0 214 563 | A2 | 3/1987 |
| EP | 1 022 166 | A2 | 7/2000 |
| EP | 1 162 092 | A2 | 12/2001 |
| WO | 01/73313 | A2 | 10/2001 |

OTHER PUBLICATIONS

European Search Report 08017651.1 mailed on Apr. 7, 2009.

* cited by examiner

MAGNETO-RHEOLOGICAL INERTIAL DAMPING SYSTEM FOR LIFT TRUCKS

CROSS-REFERENCE TO RELATED APPLICATION

Not applicable.

STATEMENT CONCERNING FEDERALLY SPONSORED RESEARCH OR DEVELOPMENT

Not applicable.

FIELD OF THE INVENTION

This invention relates to material handling apparatus, and more particularly, to improved arrangements for inertially damping the motion of the unpowered, suspended rear wheel commonly used on lift trucks.

BACKGROUND OF THE INVENTION

One class of narrow-aisle lift trucks employs a pair of unpowered non-steerable front wheels, or load wheels, a steerable powered drive wheel assembly rigidly mounted near one rear corner of the truck, and an unpowered vertically-sprung idler wheel assembly near the other rear corner of the truck. With all four wheels mounted on the same base frame, one wheel must be vertically sprung, or floor irregularities could result in loss of traction by the drive wheel. In some applications the vertically-sprung idler wheel assembly uses a free-wheeling, non-steered caster wheel which is self-steering. One early form of truck of that type is shown in U.S. Pat. No. 2,564,002. In various other applications the sprung idler wheel is not castered, but instead steered via a linkage. A truck of this latter type is shown in U.S. Pat. No. 3,392,797.

The suspended wheel is suspended from the frame of the truck by coil springs, a torsion bar or leaf springs as shown and described in U.S. Pat. No. 4,813,512, which is hereby incorporated by reference for its description of such devices. Lift trucks achieve significant economies when vehicle frames of a uniform type are used with either a castered idler wheel or a linkage-steered idler wheel. Provision of an idler wheel mounting arrangement which will readily accommodate either type of steering is disclosed in U.S. Pat. No. 3,392,797. In the idler wheel mounting arrangements disclosed in that patent, the pivot steering axis of the idler wheel is located somewhat inwardly from a lateral extremity of the truck to allow space for a castered wheel to swing. The springs used to oppose weight on the idler wheel must be aligned with the pivot or steering axis, so that they do not impose moments which would cause undue bearing wear, and hence the springs also must be located undesirably inwardly from the lateral extremity of the truck, where they tend to interfere with provisions of an unobstructed operator compartment and waste space.

One problem with prior art lift trucks is that they sway when the truck stops abruptly or abruptly changes direction or both. While such motion will not tip the truck, it can be disconcerting to an operator. Normally an operator will slow down and allow the tilt to naturally dissipate before resuming travel. Accordingly, such unwanted tilting or swaying reduces the efficiency of the operator and the overall productivity of lift truck operations.

U.S. Pat. No. 5,685,555 describes one method for providing a suspended idler wheel mounting arrangement wherein the suspension means has its motion dampened in order to limit the tilt of a lift truck following an abrupt stop or an abrupt change in direction. Here, a mechanical inertial damper is coupled between the suspended wheel and the frame. The inertial damper includes a pair of parallel outer plates, with a slider plate disposed between the plates. A pair of friction pads is provided between an outer plate and the slider plate, and frictionally engages the slider plate when the frame moves relative to the wheel to slow the relative motion between the frame and the wheel. An adjustable means, such as a belville washer or spring, is provided for adjusting pressure of the outer plates on the slider plate.

While this prior art system is effective in providing stability to the vehicle, this system can provide only a single level of damping during use, and thus cannot dynamically adjust for variations that occur in the height of the mast or the weight of the load. The present invention addresses these issues.

SUMMARY OF THE INVENTION

The present invention provides a shock absorbing system that minimizes truck dynamics, particularly in vehicles having tall masts, for use on uneven floors, and in vehicles that provide right angle stacking. The shock absorbing dampers of the present invention provide smoother ride characteristics and facilitate precision load handling by providing a stable ride for the operator.

In one aspect, the present invention provides a lift truck adapted to provide stability during use of the vehicle. The lift truck comprises a frame, with a motor and wheels mounted on the frame. At least one wheel is driven by the motor and another wheel is suspended from the frame by a spring. A movable lift mast is mounted on the frame for vertically extending and retracting. The lift mast includes a mass sufficient to tilt the frame of the truck such that a portion of the frame adjacent the suspended wheel changes its relative position with respect to ground when the truck stops abruptly or changes direction abruptly. A fork is adapted to move along the mast. A sensor is provided for producing a feedback signal indicating at least one of a height of the mast, a weight of a load on the fork, and a speed of the lift truck. A magneto-rheological damper is coupled between the suspended wheel and the frame. A vehicle control system is adapted to monitor the feedback signal and to drive the magneto-rheological damper to alter a damping force based on the feedback for speed, height or weight.

In another aspect of the invention, the vehicle control system is further adapted to drive the damper to a maximum damping force when the feedback signal exceeds a respective one of a speed, height or weight maximum damping value. The vehicle control system can also be adapted to drive the damper to a selected damping force value between the minimum damping force and the maximum damping force as a function of the feedback signal. The selected damping force can be also selected as a function of the ratio of the feedback to a maximum rated value for the lift truck.

In another aspect of the invention, the lift truck further comprises a second sensor for producing a second feedback signal indicative of another of the height of the mast, a weight of a load on the fork, and a speed of the lift truck. The lift truck can also include a third sensor for sensing the remaining height, weight, or speed parameter.

In yet another aspect of the invention the minimum damping value and the maximum damping value are calculated as a function of the rated maximum value of the parameters associated with each of the respective height of the mast, weight of a load on the fork, and speed of the lift truck.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
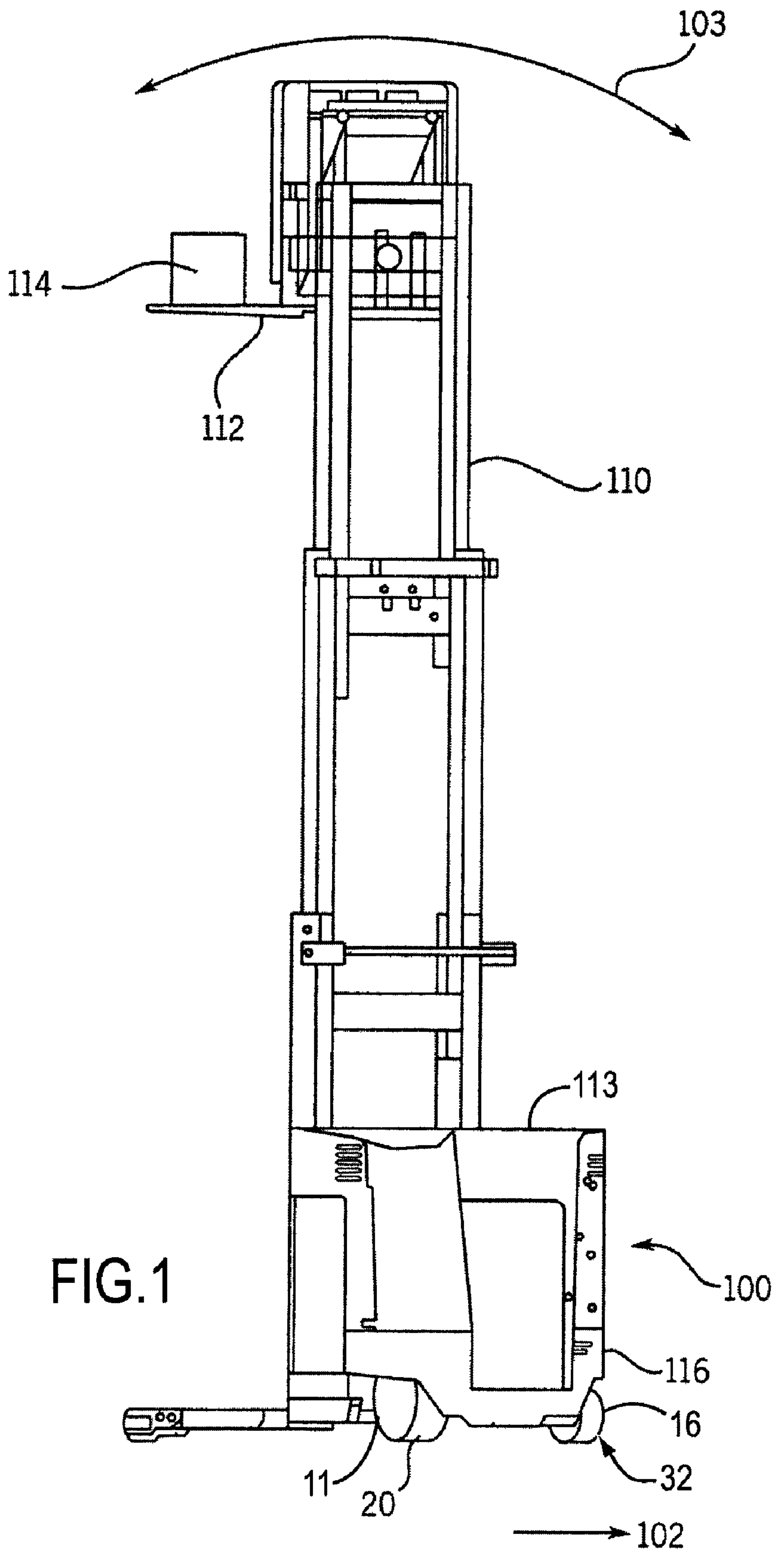
FIG. 1 is an elevation view of a lift truck with its mast extended and supporting a load.
Figure 2:
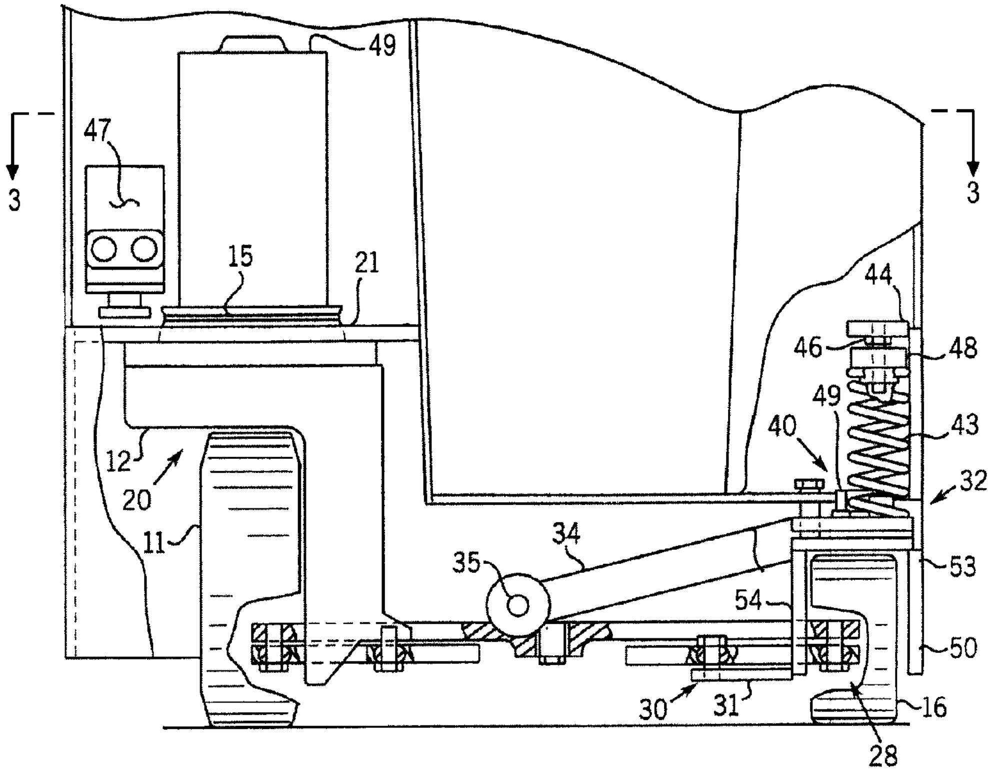
FIG. 2 is a rear elevation view of one form of lift truck incorporating a preferred form of the invention, with certain parts cut away and certain parts omitted for sake of clarity.

FIGS. 1 and 2 illustrate a lift truck 100 constructed in accordance with one embodiment of the present invention. Referring first to FIG. 1, the truck 100 comprises a mast 110 including a fork 112 that is moveable along the mast 110 to raise and lower a load 114. The mast 110 and a housing 113 are coupled to a base frame 116 of the truck 100, and a steerable powered drive wheel assembly 20 and a vertically sprung idler wheel assembly 32 support the truck 100 below the base frame 116. As described below, the idler wheel assembly 32 includes a magneto-rheological damper for stabilizing the truck 100 during operation and preferably also includes a spring assembly.

Referring now also to FIG. 2, a cutaway view of the housing 113 of the lift truck 100 is shown. The drive wheel assembly 20 includes a traction motor 49 which drives a drive wheel 11, and a steering motor 47 that is fixedly mounted relative to the base frame 116 of the truck 100 and is operated by a conventional steering control 16 (FIG. 4), which is controlled by the operator to select a direction of motion for the drive wheel 11 and truck 100. The drive wheel assembly 20 can be constructed, for example, as described in U.S. Pat. No. 5,685,555, which is incorporated by reference for its description of this assembly and the associated steering linkages. Various other methods of constructing a drive wheel assembly will be apparent to those of skill in the art.

Figure 3:
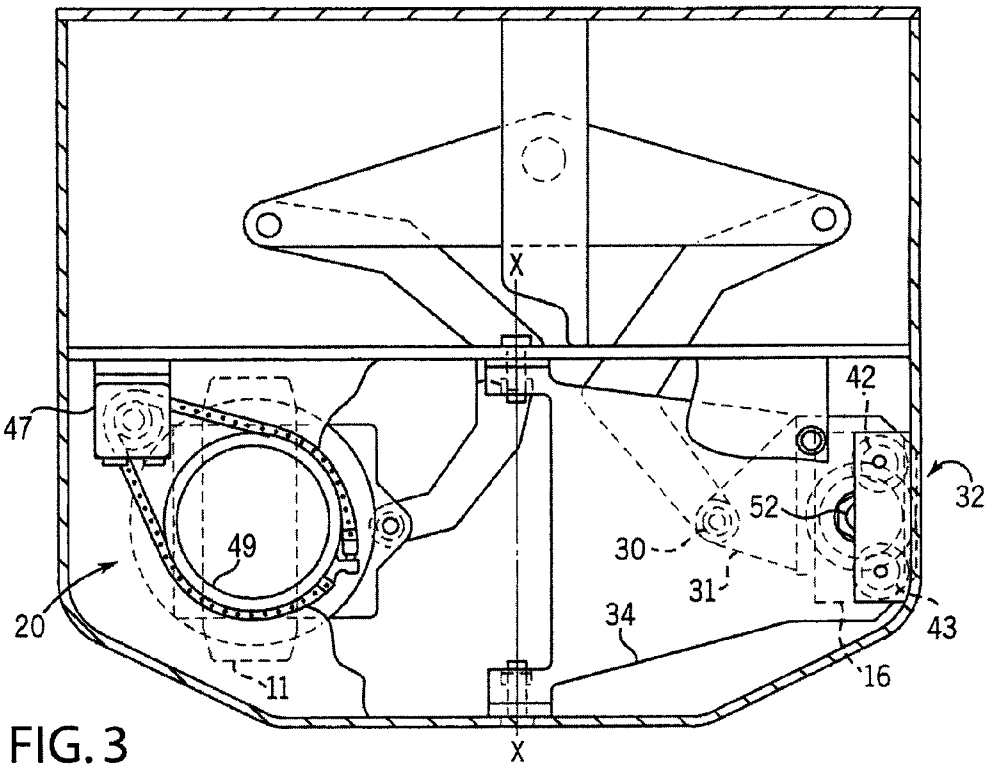
FIG. 3 is a downward section view taken at lines 3-3 in FIG. 2.
Figure 5:
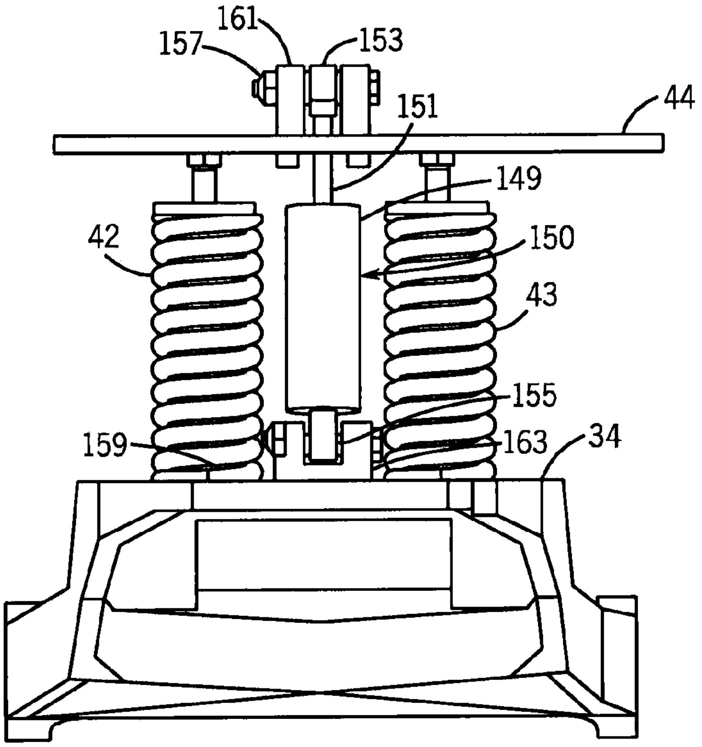
FIG. 5 is a front elevation view of the damper mounted between two coil springs.

Referring still to FIG. 2, the idler wheel assembly 32 is coupled to the housing 113 on an opposing side of the housing 113 from the drive wheel 11. Referring now also to FIG. 5, the idler wheel assembly 32 is shown journalled by means of a roller thrust bearing 40 near the outer end of a rigid A-frame arm, or lever member 34, which is shown pivotally mounted on the base frame 116 of the truck 100, near the lateral center of the truck 100, by trunnion bearings 35 so that A-frame lever member 34 may rotate limited amounts about a horizontal longitudinally-extending axis x-x (FIG. 3). A pair of compression springs 42, 43 are shown interposed between the outer end of the A-frame lever member and a plate affixed to the base frame 116 of the truck 100. Hence springs 42, 43 compress in accordance with the vertical weight imposed on the idler wheel 16, and as the truck 100 travels over irregular floor surfaces the idler wheel 16 may move upwardly and downwardly relative to the frame 116 of the truck 100 to insure that adequate weight to provide traction is always imposed on the powered drive wheel 11 of drive unit 20. As shown in FIG. 1, when truck 100 stops abruptly or abruptly changes direction, the springs 42, 43 are compressed and oscillate, thereby causing the mast 110 to oscillate, for example, in the direction of arrow 103. Such oscillation is enhanced by a load 114 carried on fork 112 that is extended to the top of the mast 110. Although a specific direction of oscillation is shown here, the induced oscillation can be in a lateral direction, in a longitudinal direction, or both.

As floor surface irregularities cause the A-frame lever member 34 to rotate about axis x-x, the steering axis of the idler wheel assembly departs slightly from the vertical, and because the idler wheel steering shaft is journalled in lever member 34 for rotation about a fixed axis, the slight rotation of the lever member causes floor contact of the idler wheel 16 to vary between the inside and outside edges of the idler wheel tire. Appreciable rotation of lever member 34 occurs when floor irregularities are encountered, when there is a rapid change in motion, or when the brakes are applied quickly.

Figure 4:
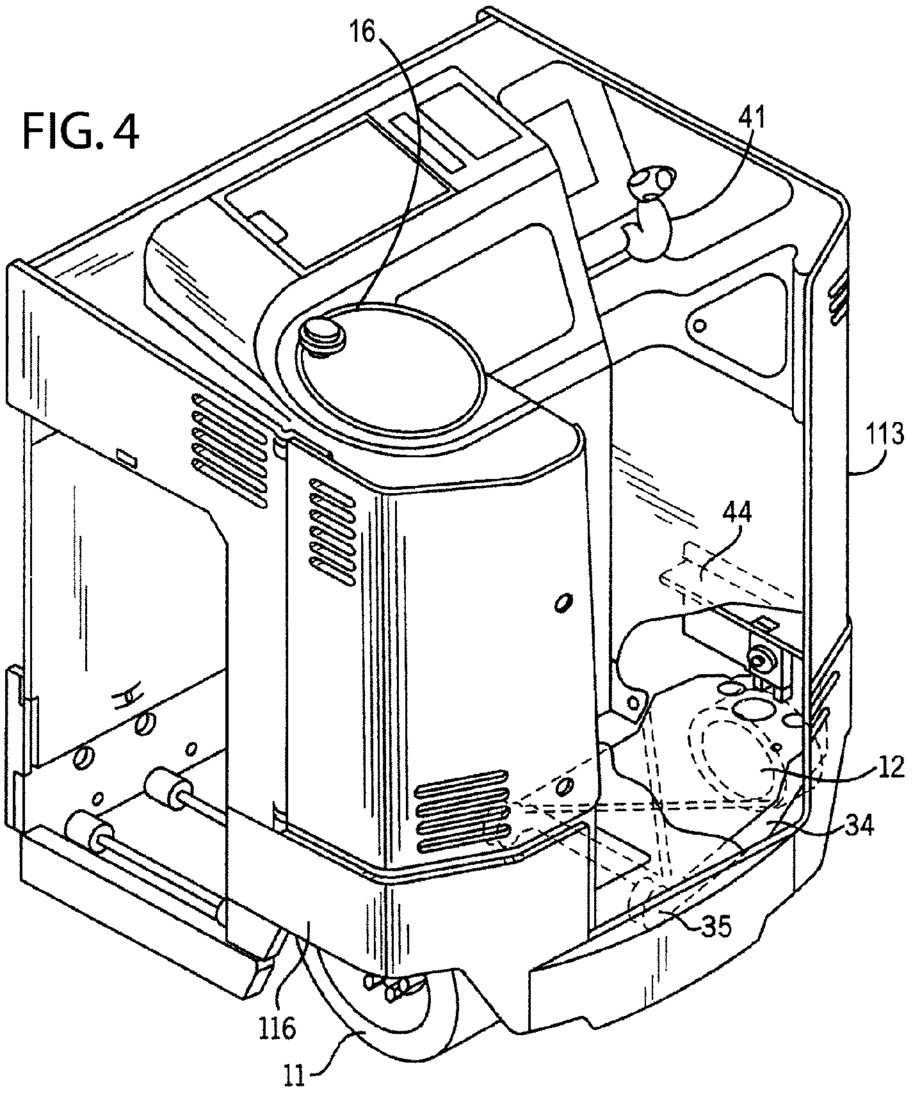
FIG. 4 is a partial perspective and partial cut away view of a lift truck showing an inertial damper on the suspended wheel.
Figure 6:
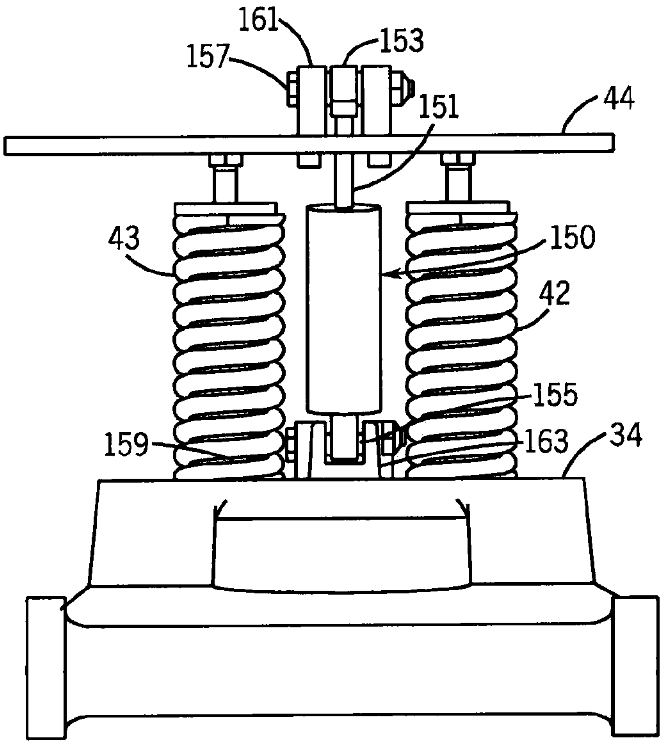
FIG. 6 is a back elevation view of the damper mounted between two coil springs.

Referring still to FIG. 2, idler wheel assembly 32 includes an idler wheel 16 (shown partially cutaway in FIG. 2), and a vertical pivot or steering shaft 52 (FIG. 3). Referring now also to FIGS. 4, 5, and 6, the idler wheel assembly 32 comprises a plate 44 that is coupled to an inside wall of the housing 113, and springs 42 and 43 are coupled between the plate 44 and the lever member 34, substantially in parallel with a magneto-rheological damper 150. The damper 150 includes a housing 149 that contains a magneto-rheological fluid, and an extendable arm 151 that extends and retracts from the housing 149. A ring connector 153 is provided at the end of the arm 151, and a ring connector 155 is provided at the opposing end of the housing. When a magnetic field is applied to the fluid, by applying a voltage and current to the fluid in the housing 149, the fluid changes from a liquid to a near solid, increasing the damping force of the damper 150. Although a number of commercial devices are available for providing this function, one example of a magneto-rheological device suitable in the present application is the RD-1005-3 MR Damper from Lord Corporation of Cary N.C.

Referring still to FIGS. 5 and 6, a mounting member 161 is coupled to the plate 44, and a mounting member 163 is coupled to the lever arm 34. Each of the mounting members 161 and 163 include two legs, which are positioned on opposing sides of the ring connectors 153 and 155, respectively, at opposing ends of the damper 150, and include bores that axially align with bores in the legs (not shown). Fasteners, 157 and 159, are connected to the mounting members 161 and 163 through the ring connector 153 and 155, respectively, coupling the opposing ends of the damper 150 to the plate 44 and the lever arm 34.

Figure 7:
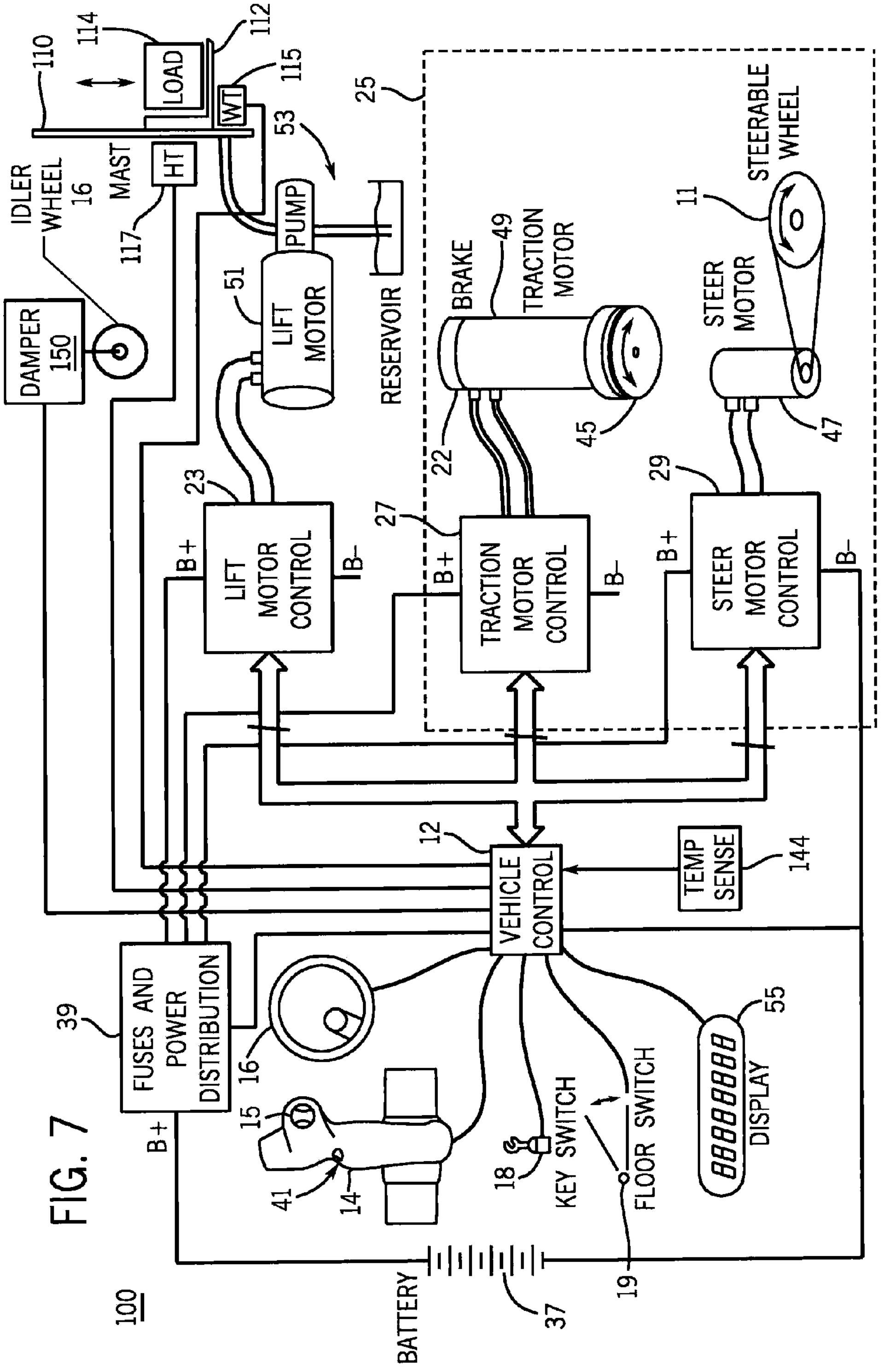
FIG. 7 is a block diagram of a control system for the lift truck of FIG. 1.

Referring now to FIG. 7, a block diagram of a control system for one embodiment of a lift truck 100 constructed in accordance with the present invention is shown. The lift truck 100 comprises a vehicle control system 12 which receives operator input signals from the operator control handle 14, the steering wheel 17, a key switch 18, and the floor switch 19 and, based on the received signals, provides command signals to each of a lift motor control 23 and a drive system 25 including both a traction motor control 27 and a steer motor control 29. The drive system 25 provides a motive force for driving the truck 100 in a selected direction, while the lift motor control 23 drives forks 112 along the mast 110 to raise or lower a load 114. The lift truck 100 and vehicle control system 12 are powered by one or more battery 37, coupled to the vehicle control system 12, drive system 25, steer motor control 29, and lift motor control 23 through a bank of fuses or circuit breakers 39.

As noted above, the operator inputs include a key switch 18, floor switch 19, steering wheel 17, and an operator control handle 14. The key switch 18 is activated to apply power to the vehicle control system 12, thereby enabling the lift truck 100. The floor switch 19 provides a signal to the vehicle control system 12 for operating the brake 22 to provide a deadman braking device, disabling motion of the vehicle unless the floor switch 19 is activated by the operator.

The operator control handle 14 provides a travel request signal to the vehicle control system 12. Typically, the handle 14 is rotated in a vertical plane to provide a travel direction and speed command of motion for the lift truck 10, and includes a switch 15 located on the top of the handle 14 that can provide a tilt up/down function when activated in the forward and reverse directions and a sideshift right and left function when activated to the right and left directions. A plurality of control actuators 41 located on the handle 14 provide a number of additional functions, and can include, for example, a reach push button, a retract push button, and a horn push button as well as a potentiometer providing a lift function. A number of other functions could also be provided, depending on the construction and intended use of the lift truck 10.

The traction motor control 27 drives the traction motor 49 which is connected to wheel 11 to provide motive force to the lift truck. The speed and direction of the traction motor 49 and associated wheel 11 is selected by the operator from the operator control handle 14, and is typically monitored and controlled through feedback provided by a speed sensor 45 which can be an encoder or other feedback device coupled to the traction motor 49. The wheel 11 is also connected to friction brake 22 through the traction motor 49, to provide both a service and parking brake function for the lift truck 10. The friction brake 22 can be a spring-activated brake that defaults to a "brake on" position, such that the switch 20 and associated brake 22 therefore provide the deadman braking function. The operator must provide a signal indicating that the deadman brake is to be released to drive the truck, here provided by the floor switch 19, as described above. The traction motor 49 is typically an electric motor, and the associated friction brakes 22 can be either electrically operated or hydraulically operated devices. Although one friction brake 22, motor 49, and wheel 11 are shown, the lift truck 100 can include one or more of these elements. Various other types of braking systems could also be used.

The steer motor control 29 is connected to drive a steer motor 47 and associated steerable wheel 11 in a direction selected by the operator by rotating the steering wheel 17, described above. The direction of rotation of the steerable wheel 11 determines the direction of motion of the lift truck 10.

The lift motor control 33 provides command signals to control a lift motor 51 which is connected to a hydraulic circuit 53 for driving the forks 112 along the mast 110, thereby moving the load 114 up or down, depending on the direction selected at the control handle 14. In some applications, the mast 110 can be a telescoping mast, as shown here. Here, additional hydraulic circuitry is provided to raise or lower the mast 110 as well as the forks 112. Sensors 117 and 115 can be provided for monitoring the height of the mast 110 and the weight of the load 114, respectively. The sensor 117 can be, for example, an encoder driven by a belt or cable. The sensor 115 can be a transducer that measures pressure, which is then converted to a weight by the vehicle control system 12 as a function of the pressure of the hydraulic fluid. Based on the height of the mast 110, the weight of the load 114, and the speed of the truck 100, the vehicle control system 12 drives the magneto-rheological damper 150 to stabilize the lift truck 100, as described more fully below. Although specific sensors are discussed above, various other sensing methods can be used. For example, weight can be measured using fork scales, and height by using ultrasonic, radar, laser, or infrared measuring devices. Other types of measuring devices will be apparent to those of skill in the art.

Referring again to FIG. 1, in operation, as the truck 100 moves backward and abruptly stops, the mast 110 can begin to tilt in the direction indicated by arrow 103 and pivot about a line between the drive wheel contact with the floor and the right front load wheel contact with the floor so that the base 116 of the truck 100 compresses the springs 42, 43. Without the damper 150 the truck 100 would oscillate aided by springs 42, 43. Once oscillation begins in typical prior art vehicles, the truck continues to oscillate until the oscillation is dissipated through friction inherent in the suspension members. However, with the magneto-rheological damper 150, the vehicle control system 12 can activate the magneto-rheological damper 150 to retard the motion of the frame 116.

Figure 8:
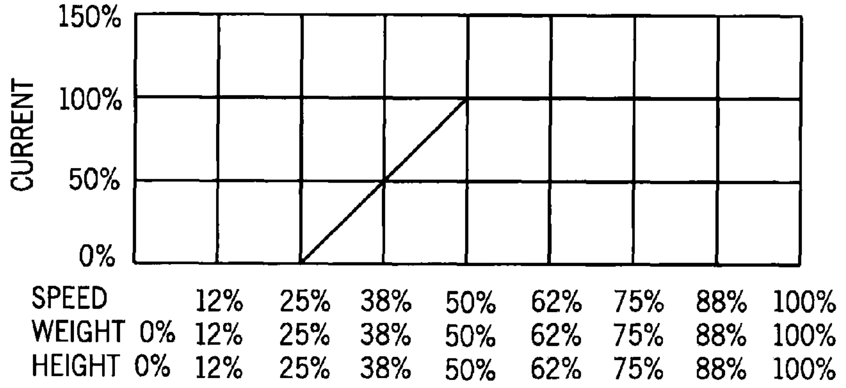
FIG. 8 is a graph illustrating the current applied for percentages of maximum rated height, weight and speed levels.

Referring still to FIG. 7 and now also to FIG. 8, a graph illustrating the application of the damper 150 is shown. As shown in the graph of FIG. 8, current can be applied to the damper 150 by the vehicle control system 12 to adjust the damping force of damper 150 under varying height, weight, and speed conditions as shown. During operation, the vehicle control system 12 receives speed feedback from sensor 45, height feedback from the height sensor 117 and weight feedback from the weight sensor 115. Based on these feedback signals, the vehicle control system 12 adjusts the current applied to the damper 150, thereby adjusting the damping force applied by the damper 150.

Referring now specifically to FIG. 8, when no load is on the mast 110 and the mast 110 is in a lowered state, the vehicle control system 12 retains the damping force of the damper 150 at a minimum value. When any of the speed, weight, and height parameters reaches a predetermined minimum damping value, the vehicle controller 12 begins applying current to the damper 150, such that the damper 150 begins applying a damping force at a selected value. The applied current is ramped up at a steady rate, shown here as linear, until any of the speed of the vehicle, the height of the mast, or the weight of the load reaches a maximum damping value. At this level, the vehicle control system 12 drives the damper 150 to a maximum damping force level, and the vehicle controller 12 continues to apply the maximum current until the mast height, load weight, and speed all fall below the maximum value. By adjusting the damper as described, additional stability is provided when lifting or transporting a heavy load, when driving the truck with the mast 110 in an extended position, and when driving the lift truck 100 at a relatively high rate of speed or abruptly changing the direction of travel. When the damper 150 is activated, the truck 100 receives additional stabilizing support, thereby limiting instability, and truck sway or oscillation. When the damper 150 is not active, as, for example, during unloaded operation, the suspension of the truck is relatively soft, limiting operator fatigue.

Referring still to FIG. 8, it has been shown experimentally that applying a damping force when the speed of the lift truck, weight of the load, or height of the mast exceeds 25% of the maximum rated value provides stability to the vehicle, while maintaining a soft ride when damping is not required. To maintain stability, the amount of damping can be increased linearly as the speed, height or weight increase between 25% and 50% of the maximum rated value. After any of the speed, height, or weight values exceeds 50% of the maximum rated value, the maximum damping value is applied until all of these values falls below 50%. Although no example is shown here, it will be apparent that these factors can be varied, while generally increasing damping as the height, weight, and/or speed of the vehicle increases and decreasing the damping as these parameters decrease.

Figure 9:
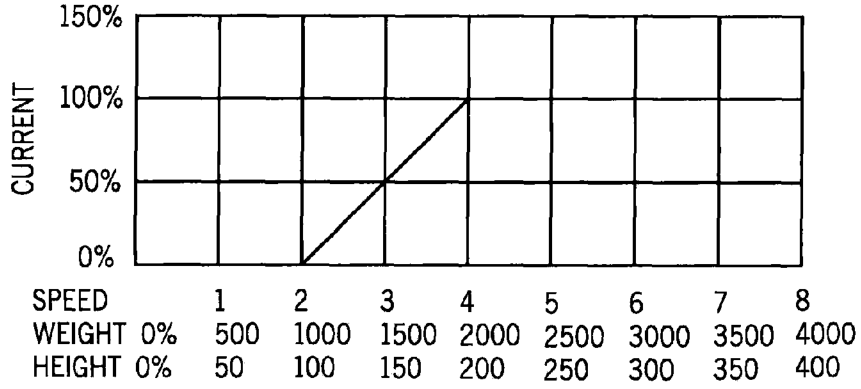
FIG. 9 is a graph illustrating the current applied for percentages of maximum rated height, weight and speed levels for a specific vehicle.
Figure 10:
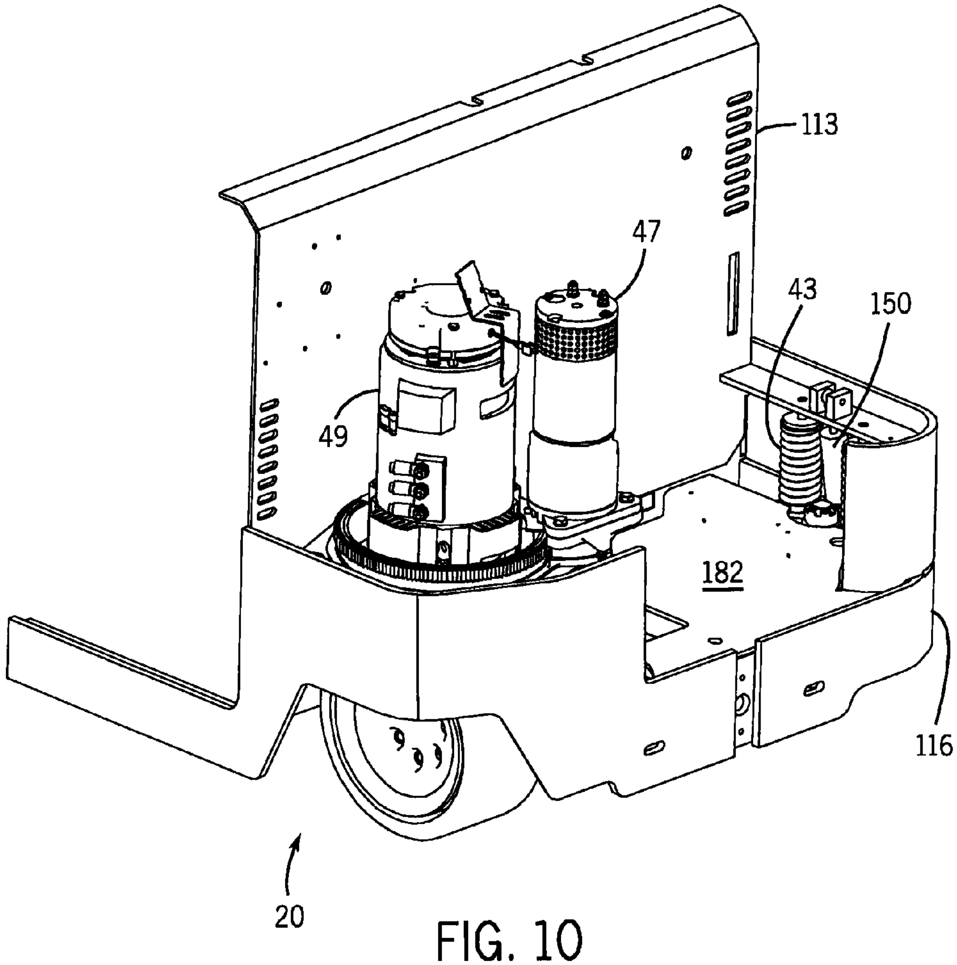
FIG. 10 is a partial view of a lift truck constructed in accordance with a second embodiment of the invention.

Referring now to FIG. 9, in one specific example, the speed of the vehicle varies from zero to eight miles per hour, the weight of a load that can be carried by the forks 112 of the vehicle is limited to about four thousand pounds, and the mast is extendable between zero and four hundred inches. Here, the vehicle control system 12 applies no current to the damper 150, and the applied damping force is therefore is substantially zero, until at least one of the speed, weight, and height exceeds a minimum damping value. Here, specifically, the vehicle controller drives the controller at zero amps until the speed of the lift truck 100 exceeds two miles per hour, the weight of the load 114 carried on the fork 112 exceeds one thousand pounds, or the height of the mast exceeds one hundred inches. When any of these minimum damping values are exceeded, the vehicle controller 12 beings to apply current to the damper 150, such that the damper 150 begins applying a damping force to the idler wheel assembly 32. The current applied by the vehicle controller 12 is ramped up at a steady rate until any of the speed, weight, or height values exceeds a maximum damping value, specifically four miles per hour, two thousand pounds or two hundred inches, respectively. At this level, the vehicle controller 12 applies the maximum current of one amp to the damper 150, providing a counterforce of about 1500N and continues to apply this level of damping until each of the speed, height, and weight falls below the maximum damping value. Additionally, although the damping force is shown increasing linearly, the force can be stepped up in various range levels or otherwise adjusted based on the characteristics of the vehicle.

Although the vehicle control system 12 is described above as receiving input from each of the speed sensor 44, height sensor 117 and weight sensor 115, the damper 150 can also be adjusted based on input from any one or more of these sensors. Furthermore, although specific percentages for adjusting the damping are described above, more generally speaking, the damping force should be increased as the vehicle speed increases, the height of the mast increases and the weight of the load increases. Using these guidelines, the damping of the vehicle can be adjusted for different levels.

Referring now to FIGS. 10-13, an alternative embodiment of a lift truck including a magneto-rheological damping systems is shown, wherein like numbers are used for elements described with reference to FIGS. 1-6 above. As described above, the lift truck 100 includes a drive wheel assembly 20 including a traction motor 49, steering motor 47, and drive wheel 11. An idler wheel 16 is also suspended from the frame. Here, however, the suspension system provided below the floor 182 is a walking beam suspension system 170.

Figure 11:
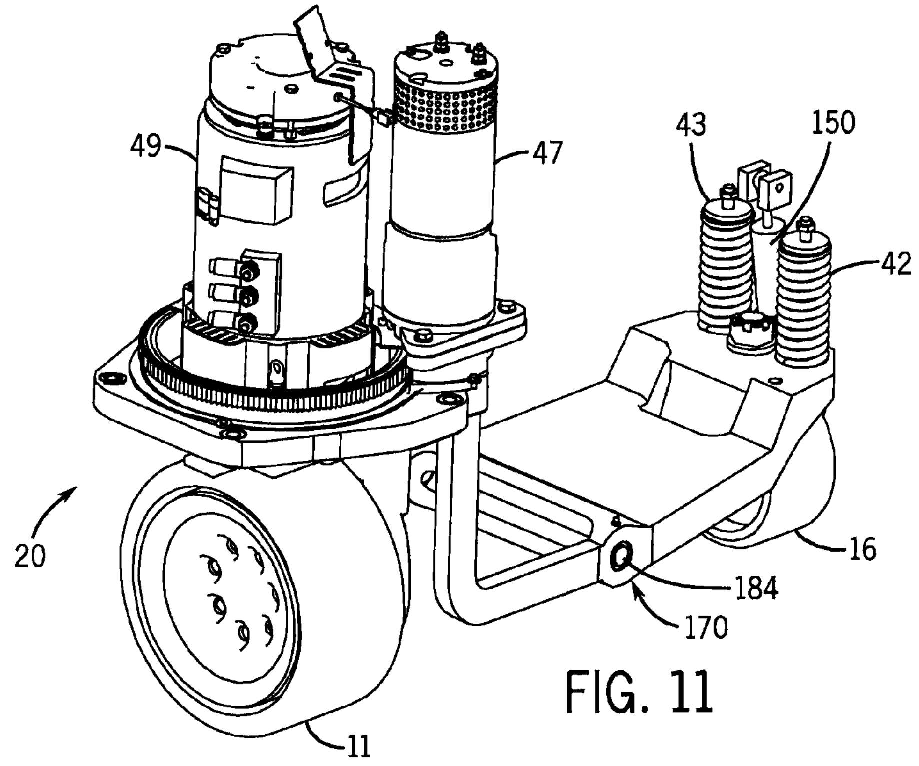
FIG. 11 is a perspective view of a suspension system provided in the lift truck of FIG. 10.
Figure 12:
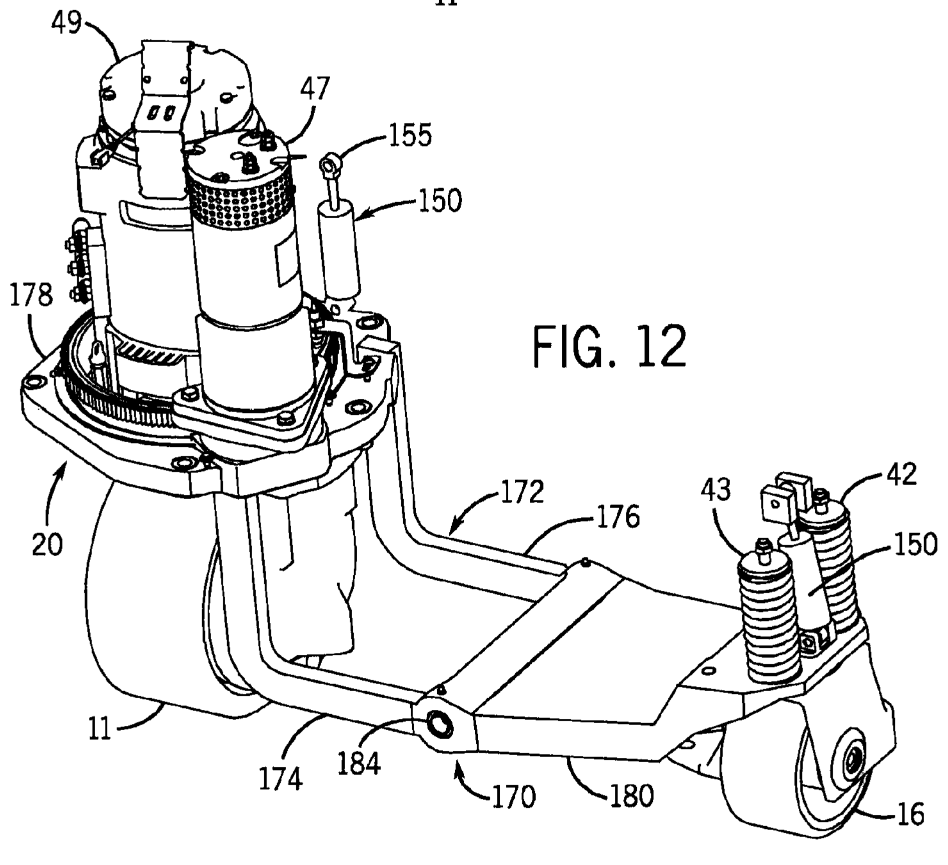
FIG. 12 is a second perspective view of a suspension system provided in the lift truck of FIG. 10.
Figure 13:
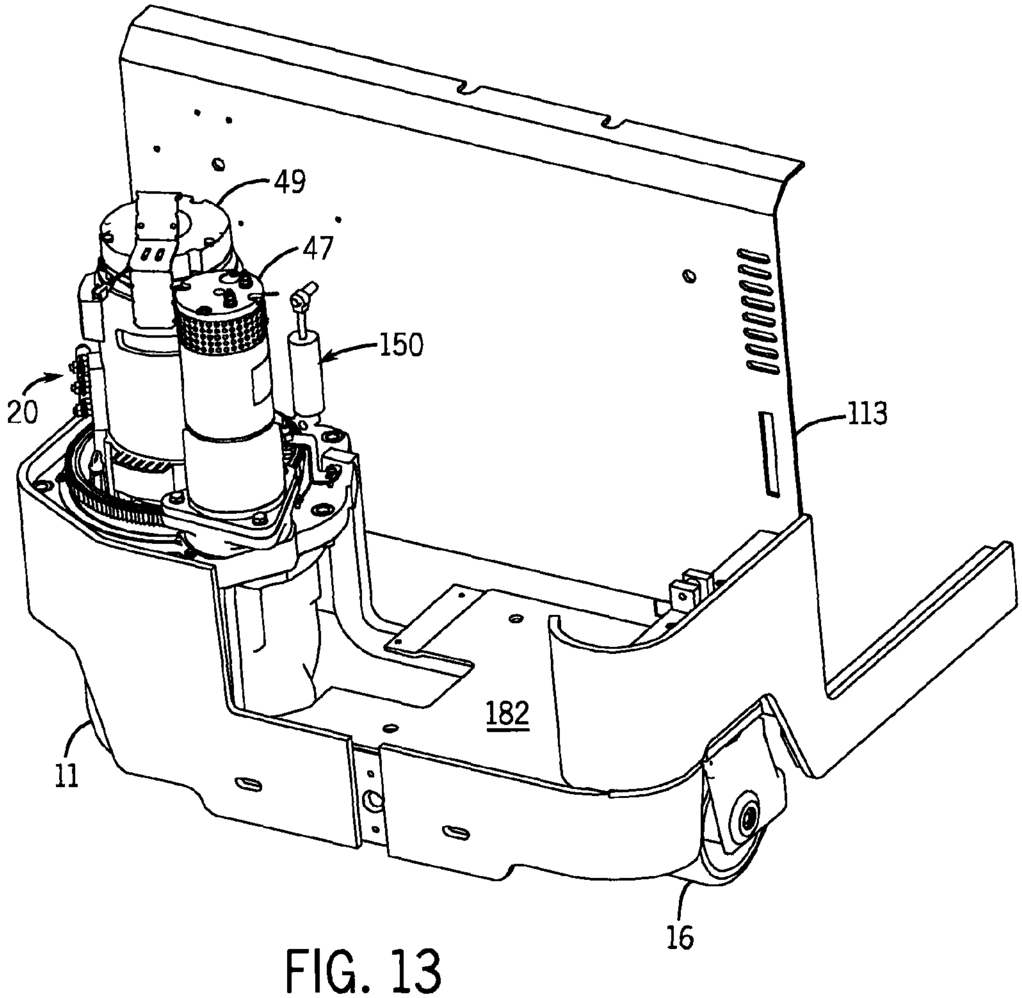
FIG. 13 is another partial view of the lift truck of FIG. 10.

Referring now to FIGS. 11 and 12, the walking beam suspension system 170 includes a first beam assembly 172, and a second beam assembly 180 that are pivotably coupled together at a pivot point 184. The idler wheel 16 is coupled to the distal end of the second beam assembly 180, and the drive wheel assembly 20 is coupled to the distal end of the first beam assembly 172. As shown here, the distal end of the first beam assembly 172 can comprise a first and second L-shaped beams 174 and 176. Optionally, springs 42 and 43 can be coupled to the second beam assembly 180 at one end, and to a plate 44 coupled to an inside wall of the housing 113 as described above with reference to FIG. 4. To stabilize the truck and limit oscillations, a magneto-rheological damper 150 can be coupled between the second beam assembly 180 and a plate 44 that is coupled to an inside wall of the housing 113, as described above with reference to FIGS. 5 and 6. Alternatively, or in addition to the magneto-rheological damper 150, a magneto-rheological damper 184 can be coupled to the drive motor assembly 20 as, for example, between a motor mounting plate 178 and a substantially vertical toe plate that forms part of the housing 113 (FIG. 13). The magneto-rheological damper 184 can also be coupled anywhere between the motor mounting plate 178 or first beam assembly 172 and the housing 113, or more generally between the suspension system and the housing.

A preferred embodiment of the invention has been described in considerable detail. Many modifications and variations to the preferred embodiment described will be apparent to a person of ordinary skill in the art. It should be understood, therefore, that the methods and apparatuses described above are only illustrative and do not limit the scope of the invention, and that various modifications could be made by those skilled in the art that would fall within the scope of the invention. To apprise the public of the scope of this invention, the following claims are made:

I claim:

1. A lift truck comprising:

a frame;

a motor and wheels mounted on the frame with at least one wheel driven by the motor and another wheel suspended from the frame;

a movable lift mast mounted on the frame for vertically extending and retracting and having a mass sufficient to tilt the frame of the truck such that a portion of the frame adjacent the suspended wheel changes its relative position with respect to ground when the truck stops abruptly or changes direction abruptly;

a magneto-rheological damper coupled between the suspended wheel and the frame;

a fork adapted to move along the mast;

a sensor for producing a feedback signal indicating at least one of a height of the mast, a weight of a load on the fork, and a speed of the lift truck; and a vehicle control system monitoring the feedback signal and adjusting a damping force of the magneto-rheological damper based on the feedback signal, said vehicle control system driving the damper to a selected damping force value between a minimum damping force and a maximum damping force as a function of a level of the feedback signal.

2. The lift truck as recited in claim 1, wherein the vehicle control system adjusts the damping force when the feedback signal exceeds a respective one of a speed, a height or a weight minimum damping value.

3. The lift truck of claim 1, wherein the vehicle control system drives the magneto-rheological damper at a minimum damping force when the feedback signal is below a respective one of a speed, a height or a weight minimum damping value.

4. The lift truck as recited in claim 1, wherein the vehicle control system drives the damper to a maximum damping force when the feedback signal exceeds a respective one of a speed, height or weight maximum damping value.

5. The lift truck as recited in claim 1, wherein the selected damping force value is selected as a function of the ratio of the feedback to a respective one of a speed, a height, and a weight maximum rated value for the lift truck.

6. The lift truck as recited in claim 1, wherein the selected damping force ramps linearly between the minimum and the maximum damping force.

7. The lift truck as recited in claim 1, further comprising a second sensor for producing a second feedback signal indicative of another of the height of the mast, a weight of a load on the fork, and a speed of the lift truck.

8. The lift truck as recited in claim 7, wherein the vehicle control system monitors the second feedback signal and drives the magneto-rheological damper to increase a damping force when at least one of the feedback signal and the second feedback signal exceeds a respective minimum damping value.

9. The lift truck as recited in claim 7, wherein the vehicle control system drives the magneto-rheological damper at a maximum damping force when one of the first and second feedback signals exceeds a corresponding maximum damping value, and to decrease the damping force below the maximum damping force when each of the feedback signal and the second feedback signal fall below a corresponding maximum damping value.

10. The lift truck of claim 7, further comprising a third sensor for producing a third feedback signal indicative of another of the height of the mast, a weight of a load on the fork, and a speed of the lift truck, and wherein the vehicle control system drives the magneto-rheological damper to increase the damping force when any of the feedback signal, the second feedback signal, and the third feedback signal exceeds a corresponding minimum damping value.

11. The lift truck as recited in claim 10, wherein the vehicle control system drives the magneto-rheological damper at a maximum damping force when one of the feedback signal, the second feedback signal, and the third feedback signal exceeds a corresponding maximum damping value, and decreases the damping force below the maximum damping force when each of the feedback signal, the second feedback signal, and the third feedback signal fall below a corresponding maximum damping value.

12. The lift truck as recited in claim 10, wherein the minimum damping value and the maximum damping value are selected as a function of the rated maximum value of a corresponding one of a height of the mast, a weight of a load on the fork, and a speed of the lift truck.

13. The lift truck as recited in claim 1, wherein the sensor is a height sensor.

14. The lift truck as recited in claim 13, further comprising a weight sensor and a speed sensor, and wherein the vehicle control system is adapted to monitor each of the weight feedback, the height feedback, and the speed feedback.

15. The lift truck of claim 1, further comprising a spring, and wherein the wheel suspended from the frame is suspended by the spring.

16. A lift truck comprising:

a frame;

a motor and wheels mounted on the frame with at least one wheel driven by the motor and another wheel suspended from the frame by a spring;

a movable lift mast mounted on the frame for vertically extending and retracting and having a mass sufficient to tilt the frame of the truck such that a portion of the frame adjacent the suspended wheel changes its relative position with respect to ground when the truck stops abruptly or changes direction abruptly;

a magneto-rheological damper coupled between the suspended wheel and the frame;

a fork adapted to move along the mast;

a height sensor for producing a height feedback signal indicating the height of the mast;

a weight sensor for producing a weight feedback signal indicating a weight of a load on the fork;

a speed sensor for producing a speed feedback signal indicating a speed of the lift truck; and a vehicle control system monitoring the height feedback signal, the weight feedback signal, and the speed feedback signal, driving the magneto-rheological damper to increase a damping force when at least one monitored feedback signal exceeds a respective speed, height or weight minimum damping value, and driving the magneto-rheological damper to decrease the damping force when the speed feedback signal, height feedback signal and weight feedback signal are all below the respective minimum damping value, said vehicle control system driving the damper to a selected damping force value between the minimum damping force and a maximum damping force as a function of a level of the feedback signal.

17. The lift truck of claim 16, wherein the vehicle control system drives the damping force to a maximum value when at least one of the monitored feedback signals exceeds a respective speed, height or weight maximum damping value.

18. The lift truck of claim 16, wherein the vehicle control system drives the damping force to a selected value between the minimum and the maximum damping value when at least one of the monitored feedback signals exceeds a respective speed, height or weight minimum damping value and each of the monitored feedback signals is below the respective maximum damping value.

19. The lift truck of claim 16, wherein the vehicle control system determines the selected value as a function of the one of the speed, height or weight feedback signal that is closest to a rated maximum for the selected parameter.

20. The lift truck of claim 16, further comprising a spring, and wherein the wheel suspended from the frame is suspended by the spring.

* * * * *